Nov. 29, 1927.

J. H. WIGGINS 1,651,051

LIQUID SEALED VACUUM AND PRESSURE RELIEF VALVE

Filed June 24, 1925

INVENTOR
J. H. Wiggins.
By Bakewell & Church
ATTORNEYS

Patented Nov. 29, 1927.

1,651,051

UNITED STATES PATENT OFFICE.

JOHN H. WIGGINS, OF BARTLESVILLE, OKLAHOMA.

LIQUID-SEALED VACUUM AND PRESSURE-RELIEF VALVE.

Application filed June 24, 1925. Serial No. 39,308.

This invention relates to liquid sealed valves of the kind that are used to normally close a passageway through which gas, air or other fluid medium flows under certain conditions.

One object of my invention is to provide a valve of the general type referred to, that has no moving parts and which is so constructed that the sealing liquid will become inoperative automatically under a certain condition, thereby permitting the air or gas to flow freely through the passageway which the sealing liquid normally closes without bubbling through said liquid, and after said condition has ceased, or after normal conditions have been re-established, said sealing liquid will become operative automatically to effectively seal said passageway.

Another object is to provide a liquid sealed valve which is so constructed that when the sealing liquid is subjected to a differential pressure of a predetermined degree, said liquid will discharge automatically from the sealing compartment into a reservoir or overflow compartment, and will remain therein so long as the pressure that effected the discharge of said liquid from the sealing compartment remains above a certain degree, and will return automatically to the sealing compartment whenever said pressure drops below the differential pressure at which the sealing liquid started to escape from the sealing compartment.

Another object is to provide a valve having the desirable characteristics above described, that can be used for automatically relieving the pressure in a container or tank and also for automatically admitting air to said tank during the operation of discharging the contents of the tank. Other objects and desirable features of my invention will be hereinafter pointed out.

Briefly stated, my invention consists of a valve composed of a sealing compartment of substantially U shape in cross section, partially filled with a liquid, a reservoir or overflow compartment into which the sealing liquid is discharged from the sealing compartment, whenever said sealing liquid is subjected to a differential pressure of a predetermined degree, and a connection between said sealing compartment and overflow compartment for returning the liquid to the sealing compartment, arranged so that the velocity of the escaping air or gas will produce sufficient static pressure in said connection to eliminate the possibility of said connection allowing liquid to flow from the overflow compartment back into the sealing compartment sooner than desired. The sealing compartment is preferably of annular form in general outline and is arranged between two reservoirs or overflow compartments, one of which is connected with one leg of said sealing compartment by one or more U-shaped tubes arranged at a lower level than the sealing compartment, and the other overflow reservoir being connected with the other leg of the sealing compartment by one or more U-shaped tubes.

My improved valve can be used for various purposes, but it is particularly adapted for use on large oil storage tanks, due to the fact that it comprises no moving parts which are apt to get out of order, it normally cuts off the contents of the tank from the atmosphere, it permits gas to automatically escape from the tank whenever the internal pressure of the tank exceeds a predetermined degree, and it vents the tank or permits air to automatically enter the tank in the operation of drawing oil out of the tank.

Figure 1 of the drawings is a vertical transverse sectional view of a valve embodying my invention, designed for use on an oil storage tank, showing how the valve operates to permit gas to automatically escape from the tank.

Figure 1:
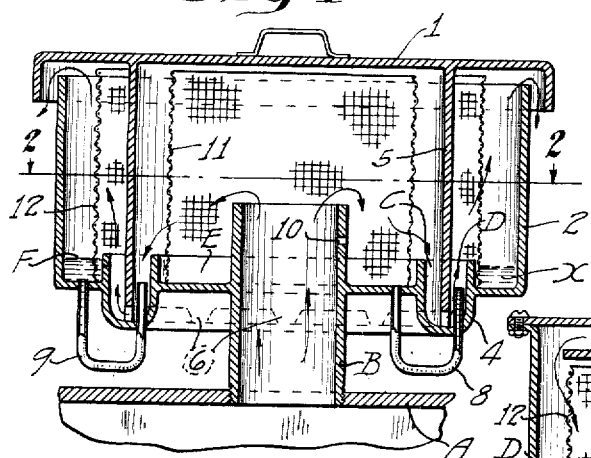
Figure 4:
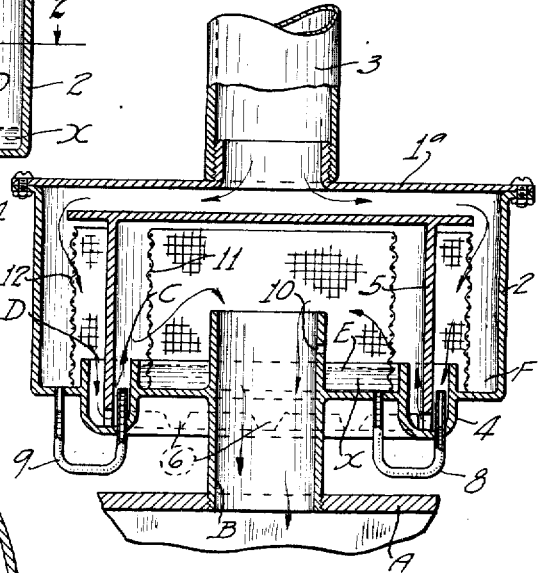
Figure 4 is a vertical transverse sectional view, illustrating how the valve operates to permit air to enter the tank on which it is used during the operation of drawing liquid out of the tank.
Figure 2:
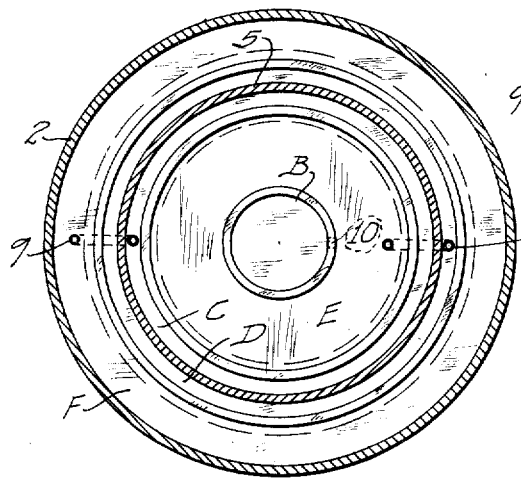
Figure 2 is a horizontal sectional view, taken on the line 2—2 of Figure 1.

In the drawings A designates a tank or container that is used for storing a volatile liquid, such as crude oil, and B designates a pipe that leads from the top of said tank. My improved valve is so constructed that it normally cuts off communication between the atmosphere and the interior of the tank A, it permits gas to escape from said tank through the pipe B under certain conditions, and it permits air to enter the tank through said pipe B during the operation of drawing liquid out of the tank. In Figures 1 and 4 I have illustrated two different forms of my invention which differ from each other principally in that the valve shown in Figure 1 is provided with a cover 1 that can be removed from the casing 2 of the valve so as to enable the contents of the tank A to be gaged by a device inserted in the tank through the pipe B, whereas, the valve shown in Figure 4 is provided with a stationary cover 1ª secured by fastening devices to the casing 2 of the valve. There is the further distinction that the valve shown in Figure 1 is so constructed that the gases which escape from the tank A pass to the atmosphere through a space between the top edge of the casing 2 and the cover 1, whereas, the valve shown in Figure 4 has a vent pipe 3 connected to the cover 1ª of the valve casing and leading away from the valve.

Figure 3:
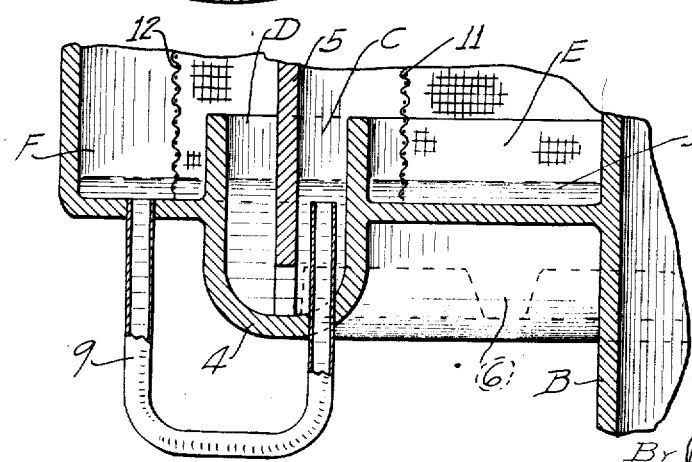
Figure 3 is an enlarged transverse sectional view of a portion of the valve, showing the normal condition of the sealing liquid in the sealing compartment.

In both forms of my invention above referred to C and D designate the two legs of a sealing compartment of U shape in transverse cross section, formed preferably by an annular trough 4 provided with an annular partition 5 whose lower edge portion is constructed in such a manner as to establish communication between the two legs C and D of the sealing compartment, such communication being established in any suitable way, as, for example by providing the lower edge of the partition 5 with a plurality of spaced projections 6 that rest on the bottom of the trough 4, and thus form numerous connecting ports or passageways between the two legs of the sealing compartment, as shown in broken lines in Figures 1, 3 and 4. At one side of said sealing compartment is a reservoir or overflow compartment E into which the sealing liquid $x$ can escape from the leg C of the sealing compartment, and at the other side of said sealing compartment is a reservoir or overflow compartment F into which the sealing liquid can escape from the leg D of the sealing compartment. In the form of my invention herein illustrated, the bottoms of said overflow compartments are formed by the bottom of the casing 2 of the valve, the side walls of the overflow compartment E are formed by one wall of the trough 4 and the pipe B that establishes communication between the valve and the tank A, and the side walls of the overflow compartment F are formed by the side wall of the valve casing 2 and by one wall of the trough 4. The particular construction and form of the various compartments above referred to, however, are immaterial, so far as my broad idea is concerned, so long as the sealing compartment is substantially U-shaped in cross section and is arranged in substantially close proximity to two reservoirs or the like that are adapted to receive and hold the sealing liquid that is discharged from the sealing compartment under certain conditions.

The connections previously referred to by which the sealing liquid is returned from the overflow compartments to the sealing compartment are herein illustrated as consisting of two U-shaped tubes 8 and 9 arranged at a lower level than the bottom of the sealing compartment and combined with said sealing compartment and with the overflow reservoirs in such a way that the tube 8 establishes direct communication between the overflow reservoir E and the leg D of the sealing compartment, and the tube 9 establishes direct communication between the overflow reservoir F and the leg C of the sealing compartment. As shown in the drawings, the inlet end of each of said tubes 8 and 9 terminates flush with the bottom of the particular overflow compartment with which the said tube co-operates, and the discharge end of each of said tubes terminates at a point some distance above the lower end of the particular leg of the sealing compartment with which it co-operates. As to the level at which the discharge end of the tubes 8 and 9 terminates, said level will always be higher than the ports or passageways at the lower edge of the partition 5 of the sealing compartment, but it will vary according to the pressure at which it is desired the valve shall function. Thus, by raising or lowering the discharge ends of the tubes 8 and 9, the pressure at which the sealing liquid starts to return from the overflow reservoirs to the sealing compartment may be varied.

Normally, the sealing liquid $x$ stands at the same level in the overflow compartments E and F, and in the two legs C and D of the sealing compartment, as shown in Figure 3, thereby effectively preventing air from entering the tank A through the pipe B, and preventing gas from escaping from said tank through said pipe. When pressure increases inside of the tank A, the sealing liquid in the reservoir E and in the leg C of the sealing compartment is depressed and the liquid in the leg D of the sealing compartment is raised, but not to such a height that it escapes from said leg D into the reservoir F. When the tank pressure has increased to a predetermined degree, the sealing liquid in the leg D of the sealing compartment escapes over the upper edge of the trough 4 into the overflow compartment F, as shown in Figure 1, said abnormal pressure causing all of the sealing liquid to be discharged from the sealing compartment, and thus leaving said compartment empty so that the gases can escape freely from the tank A, without being caused to bubble through liquid. The pressure of the escaping gases is exerted on the sealing liquid in the U-tube 8 in such a way as to convert velocity head into static, thereby preventing the tube 8 from becoming unprimed, and the pressure of the escaping gases is also exerted on the discharge end of the U tube 9 in a direction tending to prevent the sealing liquid from escaping from the overflow reservoir F, back through the tube 9, into the leg C of the sealing compartment. Even though the internal pressure of the tank A exceeds the predetermined degree at which the sealing liquid starts to escape from the sealing compartment, no gas will escape through the U tubes 8 and 9, because the differential pressure at which these tubes will become unprimed is much greater than the differential pressure that effects the discharge of the sealing liquid from the sealing compartment. The U tubes 8 and 9 can be made with any excess head that may be desired without affecting the operation of the valve.

When the differential pressure in the tank drops below the pressure at which the sealing liquid started to escape from the sealing compartment, the sealing liquid escapes from the overflow reservoir F through the U tube 9, back into the sealing compartment and rises therein to such a height as to submerge the lower end portion of the partition 5 in which the connecting ports are formed, thereby cutting off communication between the atmosphere and the tank A. During the operation of withdrawing liquid from the tank A the differential pressure that is created in the tank by this operation causes the sealing liquid in the leg C of the sealing compartment to rise gradually and finally escape from same into the overflow compartment E in the same manner that the sealing liquid escapes from the leg D of the sealing compartment into the overflow reservoir F when an abnormal pressure is created in the tank A. Thereafter, when atmospheric pressure is re-established in the tank A, the sealing liquid returns from the overflow reservoir E, back to the sealing compartment, through the U tube 8.

As shown in the drawings, the pipe B leading from the tank A is provided with a safety overflow 10, and annular baffles 11 and 12 of wire gauze or any other suitable material are arranged in the overflow reservoirs at opposite sides of the sealing compartment, so as to separate the sealing liquid from the gas or air that travels through the valve in the operation of relieving a vacuum or abnormal pressure in the tank A.

Having thus described my invention, what I claim as new and desire to secure by Letters Patent is:

1. A valve of the class described, comprising a U-shaped sealing compartment arranged in the path of travel of a fluid medium and provided with a sealing liquid that normally prevents said fluid medium from flowing through said compartment, a reservoir into which said sealing liquid escapes under certain conditions, and a U-shaped connection between said reservoir and sealing compartment for returning the sealing liquid to said compartment, disposed so that the pressure of the fluid medium circulating through the sealing compartment is utilized to prevent premature return of the sealing liquid to the sealing compartment.

2. A valve of the class described, comprising a U-shaped sealing compartment partially filled with a sealing liquid, an overflow reservoir into which said sealing liquid escapes when it is subjected to pressure above a certain degree, a separate overflow reservoir into which the sealing liquid escapes from said sealing compartment when said sealing liquid is subjected to a vacuum of a certain intensity, a connection between one of said reservoirs and one leg of said sealing compartment for effecting the return of the sealing liquid to the sealing compartment, and a similar connection between the other overflow reservoir and the other leg of the sealing compartment, said connections being so disposed that the pressure or vacuum which effects the discharge of the sealing liquid from the sealing compartment is used to prevent premature return of the sealing liquid to the sealing compartment.

3. A valve of the class described, comprising a U-shaped sealing compartment that contains a sealing liquid, an overflow reservoir into which the sealing liquid escapes when said liquid is subjected to a predetermined pressure, a separate overflow reservoir into which said sealing liquid escapes when said liquid is subjected to a vacuum of a certain intensity, and substantially U-shaped devices arranged so as to establish direct communication at all times between one overflow reservoir and one leg of the sealing compartment and between the other overflow reservoir and the other leg of the sealing compartment, the discharge ends of said U-shaped devices terminating inside of the respective legs of said sealing compartment at points above the lower end of said compartment.

4. A liquid sealed differential pressure and vacuum valve, comprising an annular U-shaped sealing compartment provided with a liquid for normally preventing the gaseous medium from passing through said compartment, a reservoir into which said sealing liquid is adapted to be discharged by a differential pressure exerted on said sealing liquid under certain conditions, arranged so as to receive and hold the sealing liquid out of the path of travel of the gaseous medium that displaced said liquid, thereby permitting said gaseous medium to flow freely through said sealing compartment, and means for permitting the sealing liquid to be returned to the sealing compartment automatically so as to cut off the passage of the gaseous medium whenever said pressure is decreased to a point less than the pressure which effected the discharge of the sealing liquid from the sealing compartment.

5. A liquid sealed differential pressure valve provided with an annular sealing compartment of substantially U-shape in cross section that contains a sealing liquid, a reservoir into which the sealing liquid escapes automatically from the sealing compartment under certain conditions, means for permitting the return of the sealing liquid from said reservoir to said sealing compartment, and means for utilizing the velocity of the gaseous medium flowing through said compartment to prevent the sealing liquid from returning to the sealing compartment until the pressure that effected the discharge of the sealing liquid from the sealing compartment decreases.

6. A liquid sealed differential pressure valve provided with an annular sealing compartment of substantially U-shape in cross section through which the valve vents, a sealing liquid in said compartment, an overflow reservoir into which the sealing liquid escapes from the sealing compartment under certain conditions, and a U-tube for permitting the return of the sealing liquid in the sealing compartment.

7. A liquid sealed differential pressure valve provided with a sealing compartment that is adapted to hold a sealing liquid, a reservoir into which said sealing liquid escapes when the valve vents, and a return U-tube for the sealing liquid leading from said overflow reservoir to said sealing compartment, one end of said tube terminating above the initial venting point of the compartment.

8. A liquid sealed differential pressure valve, comprising an annular sealing compartment of U shape in cross section, a sealing liquid in said compartment, overflow reservoirs arranged in proximity to said compartment, and substantially U-shaped return tubes connecting said reservoirs with said sealing compartment disposed so that a fluid medium passing through the valve builds up static pressure in said return tubes.

9. A valve for controlling the admission of air and the exit of gas to and from a tank comprising an annular sealing chamber of U shape in cross section arranged in the path of travel of a fluid medium that enters or escapes from the tank, a sealing liquid in said sealing compartment that normally cuts off communication between the atmosphere and the interior of the tank, overflow reservoirs arranged so that the sealing liquid will escape automatically into one of said reservoirs when an abnormal pressure exists in the tank and will escape automatically into the other reservoir during the operation of discharging the contents of the tank, a U-shaped return tube that connects one of said reservoirs with one leg of said sealing compartment, and a U-shaped return tube that connects the other reservoir with the other leg of the other sealing compartment.

10. A valve for controlling the admission of air and the exit of gas to and from a tank, comprising an annular sealing chamber of U shape in cross section arranged in the path of travel of a fluid medium that enters or escapes from the tank, a sealing liquid in said sealing compartment that normally cuts off communication between the atmosphere and the interior of the tank, overflow reservoirs arranged so that the sealing liquid will escape automatically into one of said reservoirs when an abnormal pressure exists in the tank and will escape automatically into the other reservoir during the operation of discharging the contents of the tank, a U-shaped return tube that connects one of said reservoirs with one leg of said sealing compartment, a U-shaped return tube that connects the other reservoir with the other leg of the other sealing compartment, and baffles arranged in the path of travel of the fluid medium for separating the sealing liquid from said medium.

11. A liquid sealed valve adapted to be mounted on a tank that is used for holding a volatile liquid, a cover for said valve that is adapted to be removed to permit a gaging device to be inserted in the tank, a sealing compartment for holding a sealing liquid that normally cuts off communication between the atmosphere and the interior of the tank, overflow reservoirs into which the sealing liquid escapes from the sealing compartment.

12. A liquid sealed differential pressure and vacuum valve provided with a sealing compartment arranged in the path of travel of a fluid medium and provided with a sealing liquid that normally prevents the fluid medium from flowing through said compartment, a reservoir into which the sealing liquid escapes whenever said liquid is subjected to an approximate predetermined pressure, arranged so as to receive and hold said liquid out of the path of travel of the fluid medium which is then flowing through said compartment, and a separate reservoir into which the sealing liquid escapes whenever said liquid is subjected to an approximate predetermined vacuum, arranged so as to receive and hold said liquid out of the path of travel of the fluid medium which is then flowing through said compartment, said reservoirs being so disposed with relation to said sealing compartment that the center of gravity of the liquid when it is in either of said reservoirs is higher than the center of gravity of the liquid when it is in said sealing compartment.

13. A liquid sealed pressure and vacuum valve provided with a sealing compartment that contains a sealing liquid, a reservoir into which the sealing liquid escapes from said compartment under certain conditions, arranged so as to receive and hold said liquid out of the path of travel of the escaping gases, a second reservoir into which the sealing liquid escapes during vacuum relief, arranged so as to receive and hold the liquid out of the path of travel of the air which is then flowing through said compartment, and means for permitting the sealing liquid to return automatically from either of said reservoirs to said sealing compartment.

JOHN H. WIGGINS.

valve provided with a sealing compartment that contains a sealing liquid, a reservoir into which the sealing liquid escapes from said compartment under certain conditions, arranged so as to receive and hold said liquid out of the path of travel of the escaping gases, a second reservoir into which the sealing liquid escapes during vacuum relief, arranged so as to receive and hold the liquid out of the path of travel of the air which is then flowing through said compartment, and means for permitting the sealing liquid to return automatically from either of said reservoirs to said sealing compartment.

JOHN H. WIGGINS.

CERTIFICATE OF CORRECTION.

Patent No. 1,651,051.  Granted November 29, 1927, to

JOHN H. WIGGINS.

It is hereby certified that error appears in the printed specification of the above numbered patent requiring correction as follows: Page 4, line 29, claim 6, for the word "in" read "to"; same page, line 39, claim 7, strike out the article "the" second occurrence and insert instead "said sealing", and line 104, claim 11, after the word "compartment" and before the period insert ", one of said reservoirs being arranged so as to receive the sealing liquid that is displaced by an abnormal pressure in the tank and hold said liquid out of the path of the escaping gases, and the other reservoir being arranged so as to receive the sealing liquid that is displaced by inflowing air when a vacuum is created in the tank and hold said liquid out of the path of travel of said inflowing air, and means for permitting the sealing liquid, after being discharged into one of said reservoirs, to return to the sealing compartment when the condition that caused the discharge of said sealing liquid from said reservoir has ceased to exist"; and that the said Letters Patent should be read with these corrections therein that the same may conform to the record of the case in the Patent Office.

Signed and sealed this 10th day of January, A. D. 1928.

Seal.

M. J. Moore,
Acting Commissioner of Patents.

CERTIFICATE OF CORRECTION.

Patent No. 1,651,051. Granted November 29, 1927, to

JOHN H. WIGGINS.

It is hereby certified that error appears in the printed specification of the above numbered patent requiring correction as follows: Page 4, line 29, claim 6, for the word "in" read "to"; same page, line 39, claim 7, strike out the article "the" second occurrence and insert instead "said sealing", and line 104, claim 11, after the word "compartment" and before the period insert ", one of said reservoirs being arranged so as to receive the sealing liquid that is displaced by an abnormal pressure in the tank and hold said liquid out of the path of the escaping gases, and the other reservoir being arranged so as to receive the sealing liquid that is displaced by inflowing air when a vacuum is created in the tank and hold said liquid out of the path of travel of said inflowing air, and means for permitting the sealing liquid, after being discharged into one of said reservoirs, to return to the sealing compartment when the condition that caused the discharge of said sealing liquid from said reservoir has ceased to exist"; and that the said Letters Patent should be read with these corrections therein that the same may conform to the record of the case in the Patent Office.

Signed and sealed this 10th day of January, A. D. 1928.

Seal.

M. J. Moore,
Acting Commissioner of Patents.